United States Patent
Trim et al.

(10) Patent No.: US 10,827,335 B1
(45) Date of Patent: Nov. 3, 2020

(54) COGNITIVE EMERGENCY MANAGEMENT ON A 5G TELECOM NETWORK

(71) Applicant: INTERNATIONAL BUSINESS MACHINES CORPORATION, Armonk, NY (US)

(72) Inventors: Craig M. Trim, Ventura, CA (US); Kimberly Greene Starks, Nashville, TN (US); Michael E Alexander, Great Falls, VA (US); Gandhi Sivakumar, Melbourne (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/445,858

(22) Filed: Jun. 19, 2019

(51) Int. Cl.
*H04W 4/90* (2018.01)
*G06N 20/00* (2019.01)
(Continued)

(52) U.S. Cl.
CPC .......... *H04W 4/90* (2018.02); *G06N 5/04* (2013.01); *G06N 20/00* (2019.01); *H04W 4/029* (2018.02); *H04W 4/70* (2018.02); *H04W 76/50* (2018.02)

(58) Field of Classification Search
CPC ......... H04W 4/90; H04W 4/70; H04W 4/029; H04W 76/50; G06N 20/00; G06N 5/04
See application file for complete search history.

(56) References Cited

U.S. PATENT DOCUMENTS

| | | | |
|---|---|---|---|
| 2007/0197262 A1* | 8/2007 | Smith | H04B 3/542 455/562.1 |
| 2008/0204225 A1 | 8/2008 | Kitchen | |

(Continued)

FOREIGN PATENT DOCUMENTS

| | | |
|---|---|---|
| CN | 109067873 A | 12/2018 |
| KR | 20170067710 A | 6/2017 |
| WO | 2018200418 A1 | 11/2018 |

OTHER PUBLICATIONS

Chemodanov, D., Esposito, F., Sukhov, A. et al. (2019). AGRA: AI-augmented geographic routing approach for IoT-based incident-supporting applications. Future Generation Computer Systems, 92, pp. 1051-1065.

(Continued)

*Primary Examiner* — Ernest G Tacsik
(74) *Attorney, Agent, or Firm* — Schmeiser, Olsen & Watts; Brian M. Restauro

(57) ABSTRACT

A self-learning 5G cognitive emergency-management system responds to a triggering condition by instructing a network to open an ad hoc channel to Internet of Things (IoT) devices associated with a mass assembly of users. The system begins tracking the movements of the assembly members by performing trilateration procedures on each user's IoT device. Using artificial intelligence or cognitive analytics, the system identifies and correlates patterns in the aggregated movements of the assembly with other tracked parameters received from the IoT devices and with contextual information retrieved from extrinsic sources. The system infers aggregated user sentiment from these correlations and determines whether the movements or sentiment suggest that an unexpected event is having an adverse impact on the assembly. If so, the system takes corrective action, such as (Continued)

notifying an emergency-management resource or transmitting information or instructions to the assembly members.

20 Claims, 5 Drawing Sheets

(51) Int. Cl.
*H04W 76/50* (2018.01)
*H04W 4/029* (2018.01)
*H04W 4/70* (2018.01)
*G06N 5/04* (2006.01)

(56) References Cited

U.S. PATENT DOCUMENTS

| | | |
|---|---|---|
| 2010/0331023 A1 | 12/2010 | Cai |
| 2016/0232773 A1 | 8/2016 | Abeyta |
| 2016/0358447 A1 | 12/2016 | Le |
| 2017/0238129 A1 | 8/2017 | Maier |
| 2017/0372593 A1* | 12/2017 | Chadwick .............. G08B 27/00 |
| 2018/0168464 A1 | 6/2018 | Barnett, Jr. |
| 2018/0176886 A1 | 6/2018 | Kodaypak |
| 2018/0249315 A1 | 8/2018 | Mehta |
| 2018/0367958 A1 | 12/2018 | Dizdarevic |
| 2019/0207819 A1* | 7/2019 | Sathya .................... H04L 41/12 |
| 2019/0312689 A1* | 10/2019 | Opshaug ............... G01S 5/0226 |
| 2019/0327320 A1* | 10/2019 | Rubin ................. H04L 67/2809 |

OTHER PUBLICATIONS

Fang, S., Da Xu, L., Zhu, Y. et al. (2014). An Integrated System for Regional Environmental Monitoring and Management Based on Internet of Things. IEEE Trans. Industrial Informatics, 10(2), pp. 1596-1605.

Sakhardande, P., Hanagal, S., & Kulkarni, S. (2016). Design of disaster management system using IoT based interconnected network with smart city monitoring. Internet of Things and Applications (IOTA), International Conference on, pp. 185-190.

* cited by examiner

COGNITIVE EMERGENCY MANAGEMENT ON A 5G TELECOM NETWORK

BACKGROUND

The present invention relates in general to telecommunications networking and Internet of Things (IoT) devices and in particular to generating ad hoc networks of IoT devices to intelligently detect and mitigate the adverse effects of a critical situation that affects a mass assembly of people.

Advanced telecommunications networks, including 5G networks, offer certain features that are far more sophisticated and flexible than predecessor technologies. For example, 4G networks offer trilateration capabilities that allow a carrier to locate a user's position within about a hundred feet by comparing signals from multiple cell towers. 5G and later networks, however, can trilaterate a device's location with at least one order-of-magnitude greater precision, allowing a user's position to be identified within a range of tens of feet.

5G and similar networks can also handle far more simultaneous connections, making them more practical for Internet of Things applications, which can associate numerous IoT sensor devices with a single user. Such networks can also open high-bandwidth ad hoc channels that exhibit very low latency, allowing large groups of users to connect and disconnect at will in a dynamic mesh network. In addition, these networks can integrate artificially intelligent or cognitive applications directly into their network infrastructure, rather than requiring such functionality to be implemented as extrinsic services hosted by a cloud-computing service or other third-party resource.

SUMMARY

Embodiments of the present invention comprise methods, systems, and computer program products for a cognitive emergency-management system on an advanced computer network that offers 5G-class functionality like that described in the BACKGROUND. In general, readers should interpret references to "5G networks" to refer to any sort of current or future telecommunications network that provides such 5G-class functionality.

The system responds to a triggering condition by instructing the 5G network, into which the system is integrated, to open an ad hoc channel to Internet of Things (IoT) devices that are each associated with one member of a mass assembly. The system begins tracking the movements of each assembly member by performing trilateration procedures on that user's IoT devices. Using artificial intelligence or cognitive analytics, the system identifies and correlates patterns among the aggregated movements of one or more subsets of assembly members with other tracked parameters received from the IoT devices and with contextual information retrieved from extrinsic sources. The system infers aggregated user sentiment from these correlations and determines whether the patterns of movement or sentiment suggest that an unexpected event is having an adverse effect on the assembly. If such an adverse effect is detected, the system initiates one or more corrective actions, such as requesting aid from an emergency-management resource or transmitting information or instructions to the assembly members through the ad hoc channel.

DETAILED DESCRIPTION

Figure 1:
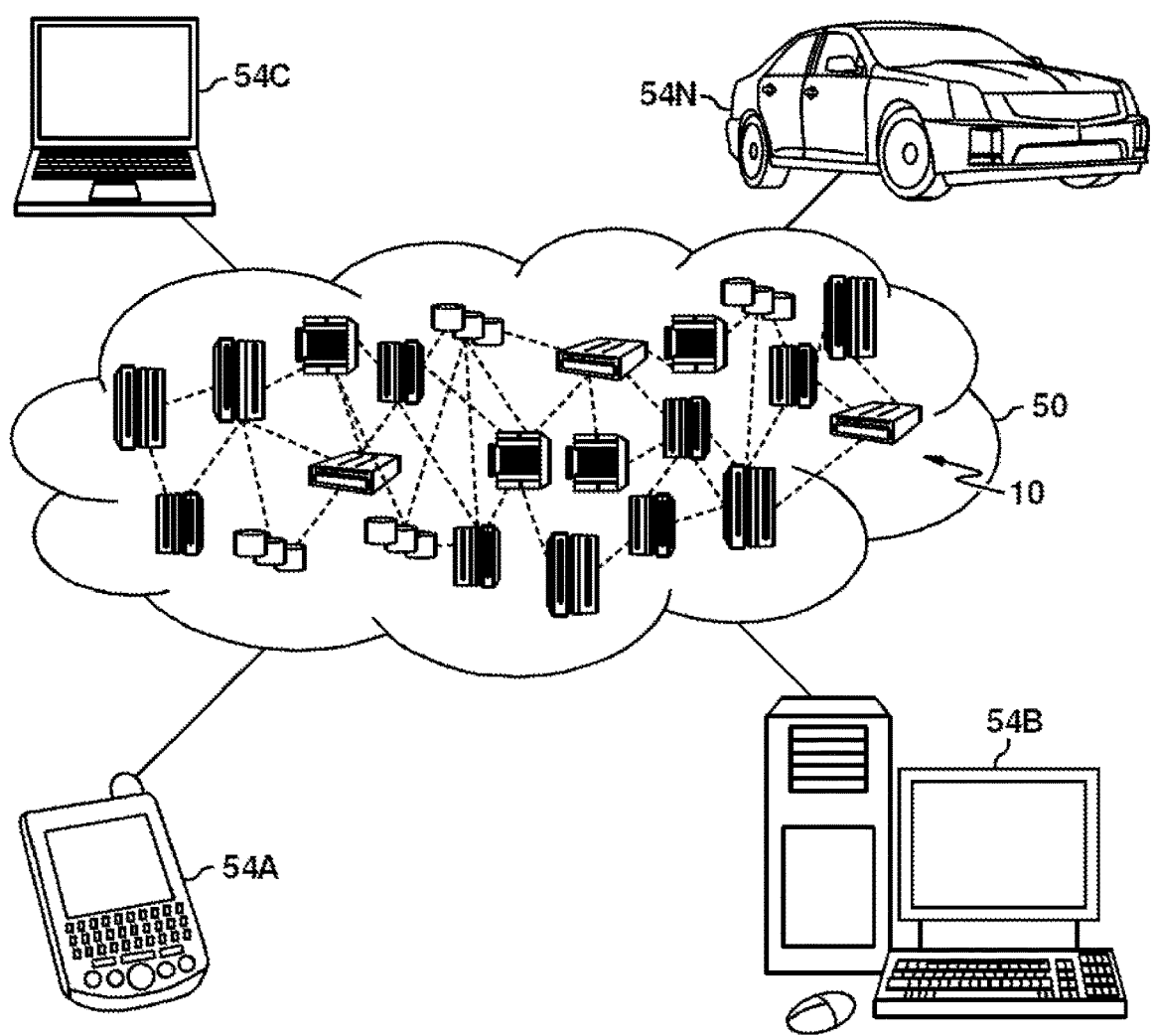
FIG. 1 depicts a cloud computing environment according to an embodiment of the present invention.

Embodiments of the present invention comprise methods, systems, and computer program products providing a cognitive emergency-management system on a computer network that offers 5G-class functionality like that described in the BACKGROUND. Readers should not construe references in this document to "5G networks" to constrain embodiments of the present invention solely to networks that conform to 5G protocols. Such references should be interpreted to include any sort of current or future telecommunications network that provides such 5G-class functionality, including the abilities to dynamically generate and manage ad hoc high-bandwidth, low-latency networks; incorporate artificial-intelligence and cognitive features into the native infrastructure of the network; and trilaterate nodes with at least 5G-like precision.

Artificial intelligence technologies, such as cognitive analytics, can infer semantic meaning from observable human behavior. For example, it is possible for a cognitive analytics-based system to infer emotional or sentiment subtext from a person's speech patterns, eye movement, or hand motions.

These principles may be applied to larger groupings of people, referred to in this document as mass assemblies. Cognitive technologies may identify patterns in the aggregate movements of such assemblies, from which may be inferred an aggregate emotional state or sentiment. For example, if an assembly of people on a crowded city street suddenly begin moving in a single direction at an unnaturally high speed, such behavior may indicate that the assembly is fleeing a hazardous condition, such as a fire, and that the people who make up that assembly are experiencing a sense of urgency or other extreme emotional state or sentiment. Similarly, if a large group of highway drivers suddenly come to a halt, such aggregate movement could indicate that a traffic accident, weather event, or other hazardous condition has blocked the road.

It is possible to make such inferences with greater precision by considering extrinsic information, such as weather conditions, the scheduling of public events, or traffic conditions. For example, if a mass assembly attending a parade suddenly disperses to covered areas, knowledge of an inclement weather forecast can add weight to an inference that the paradegoers are seeking shelter from a rainstorm.

Similarly, concurrent collection of additional parameters can supplement position and movement data with a "third dimension" parameter. For example, correlating signals that report identical movements or that are continuously in close proximity can suggest that those signals originate from devices that are all in the possession of, or at least tracking the position of, a single person. Similarly, tracking average or maximum acceleration data can allow a system to further characterize a subject's movements by revealing whether a change in position occurring between two position samplings was smooth or abrupt.

It has been difficult in the past to collect such mass-assembly movement data in real time because of limitations in the capabilities of large networks. The emergence of Internet of Things (IoT) devices and 5G networks has removed such limitations.

IoT peripherals are narrowly configured to respond to a particular combination of position, acceleration, temperature, light levels, or other types of specific parameters. In some cases, an IoT device may be portable, or even wearable. These devices may, for example, be designed to detect that an elderly user has fallen or suffered another health emergency, monitor a runner's pulse rate, control a thermostat in a heating or air-conditioning system, facilitate an automobile's collision-avoidance system by sensing the presence of nearby vehicles, or even manage door locks, coffeemakers, refrigerators, and other household items.

IoT peripherals connect seamlessly to the Internet, allowing them to report their operation or environmental conditions to an extrinsic, Internet-connected resource. For example, a fall monitor could instantly notify an emergency service the monitor detects a dangerous condition. An IoT door lock could report to a homeowner when a delivery attempt is made. And an IoT smoke detector could forward a video feed to fire departments and a homeowner if it detects the presence of smoke.

5G networks enable the mass deployment of IoT devices by providing the ability to dynamically manage very large numbers of devices on ad hoc mesh networks. If, for example, a thousand people watching a parade are each carrying an average of five IoT devices, a legacy Internet Service Provider (ISP) would likely be unable to simultaneously manage and correlate the resulting large number of connections. The flexible service-orchestration capabilities of a 5G network, on the other hand, after detecting the presence of a mass assembly, allow the network to dynamically create an ad hoc mesh network that continuously adds and removes users as IoT devices log in and log out. Unlike legacy networks, which would require an extrinsic application, such as a hosted cloud service, to even approximate such features, 5G platforms support such high-speed ad hoc infrastructure through integrated, native orchestration services.

Embodiments of the present invention can automatically generate such an ad hoc network to track movements and other behavioral characteristics of a mass assembly. Such embodiments can then use cognitive methods to infer affective subtext to the movements of the assembly. If these inferences suggest that an emergency has occurred, or that the assembly requires assistance for some other reason, the system can then take corrective action to protect the assembly from inconvenient or hazardous conditions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
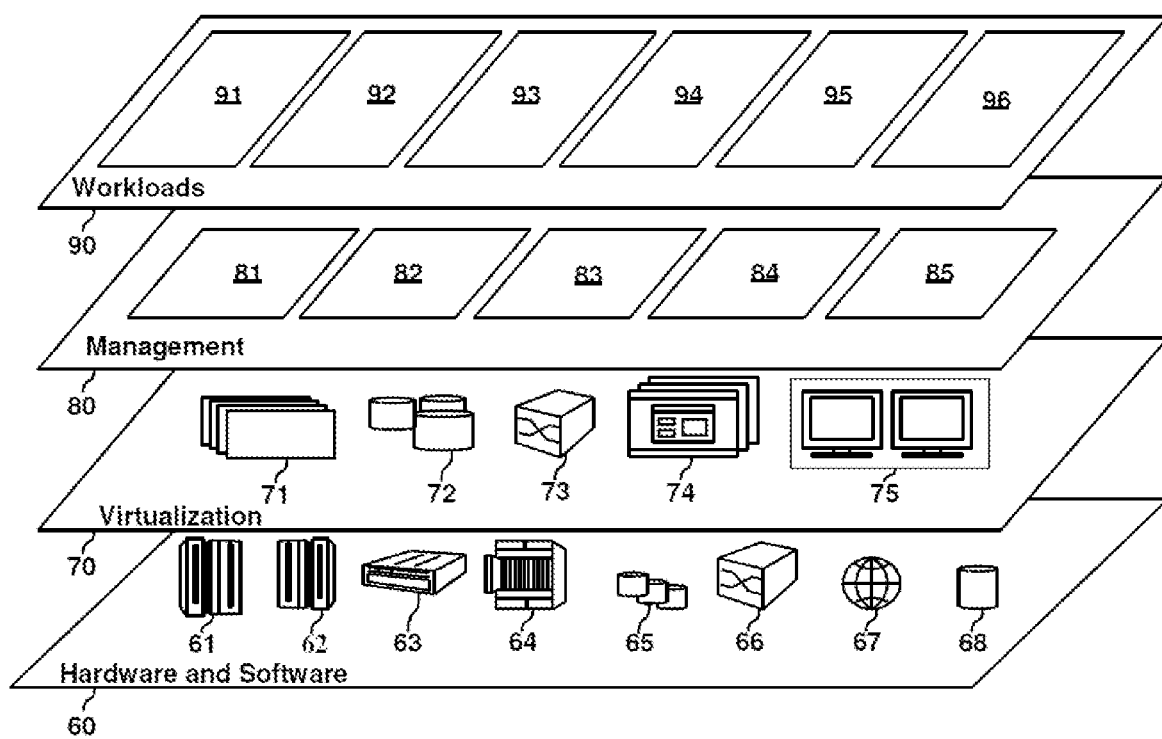
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex cognitive emergency management on a 5g telecom network.

Aspects of the present embodiment may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
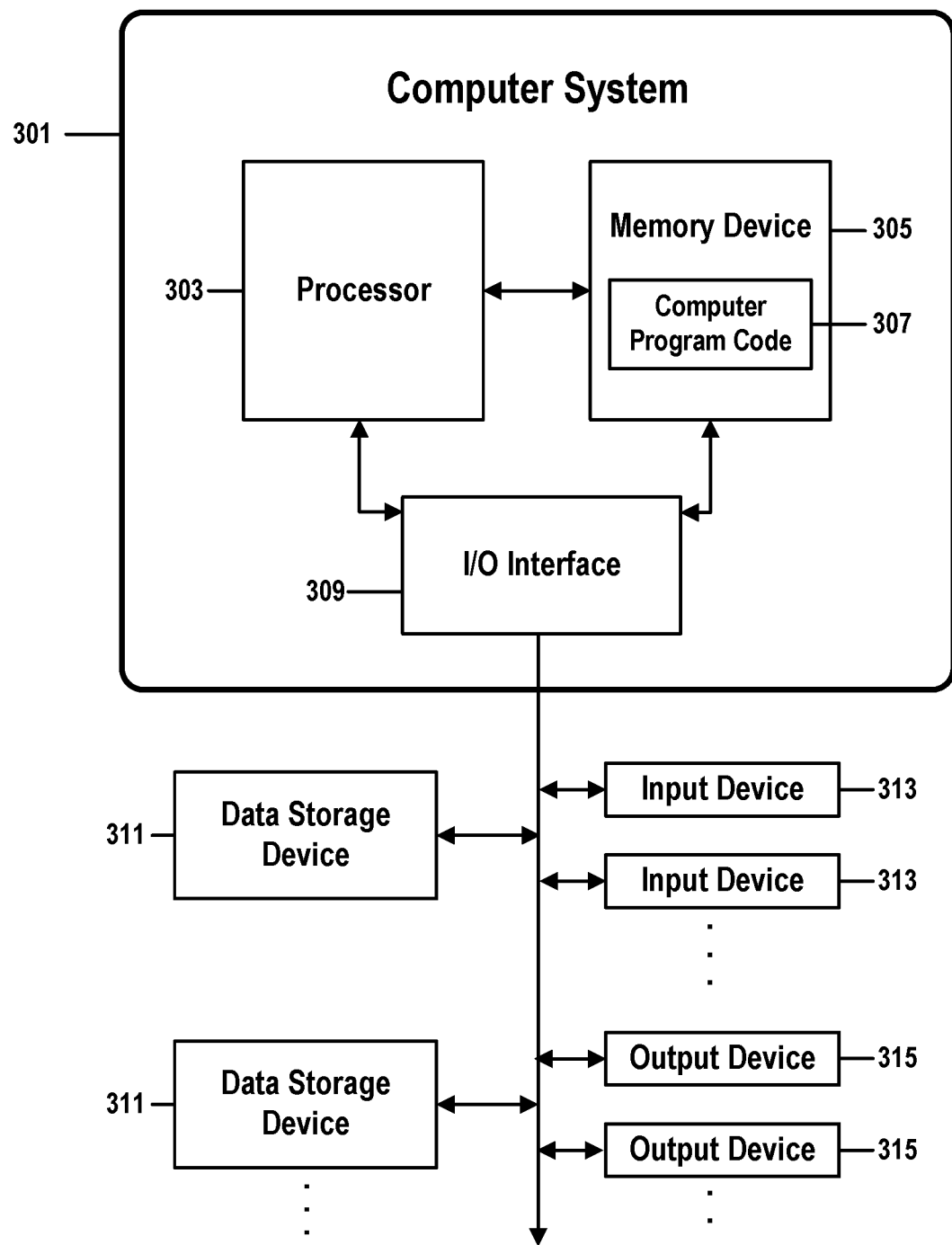
FIG. 3 shows the structure of a computer system and computer program code that may be used to implement a method for cognitive emergency management on a 5G telecom network in accordance with embodiments of the present invention.

FIG. 3 shows a structure of a computer system and computer program code that may be used to implement a method for cognitive emergency management on a 5G telecom network in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for cognitive emergency management on a 5G telecom network in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for cognitive emergency management on a 5G telecom network.

Any of the components of the present invention could be created, integrated, hosted, maintained, deployed, managed, serviced, supported, etc. by a service provider who offers to facilitate a method for cognitive emergency management on a 5G telecom network. Thus the present invention discloses a process for deploying or integrating computing infrastructure, comprising integrating computer-readable code into the computer system 301, wherein the code in combination with the computer system 301 is capable of performing a method for cognitive emergency management on a 5G telecom network.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for cognitive emergency management on a 5G telecom network may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for cognitive emergency management on a 5G telecom network is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
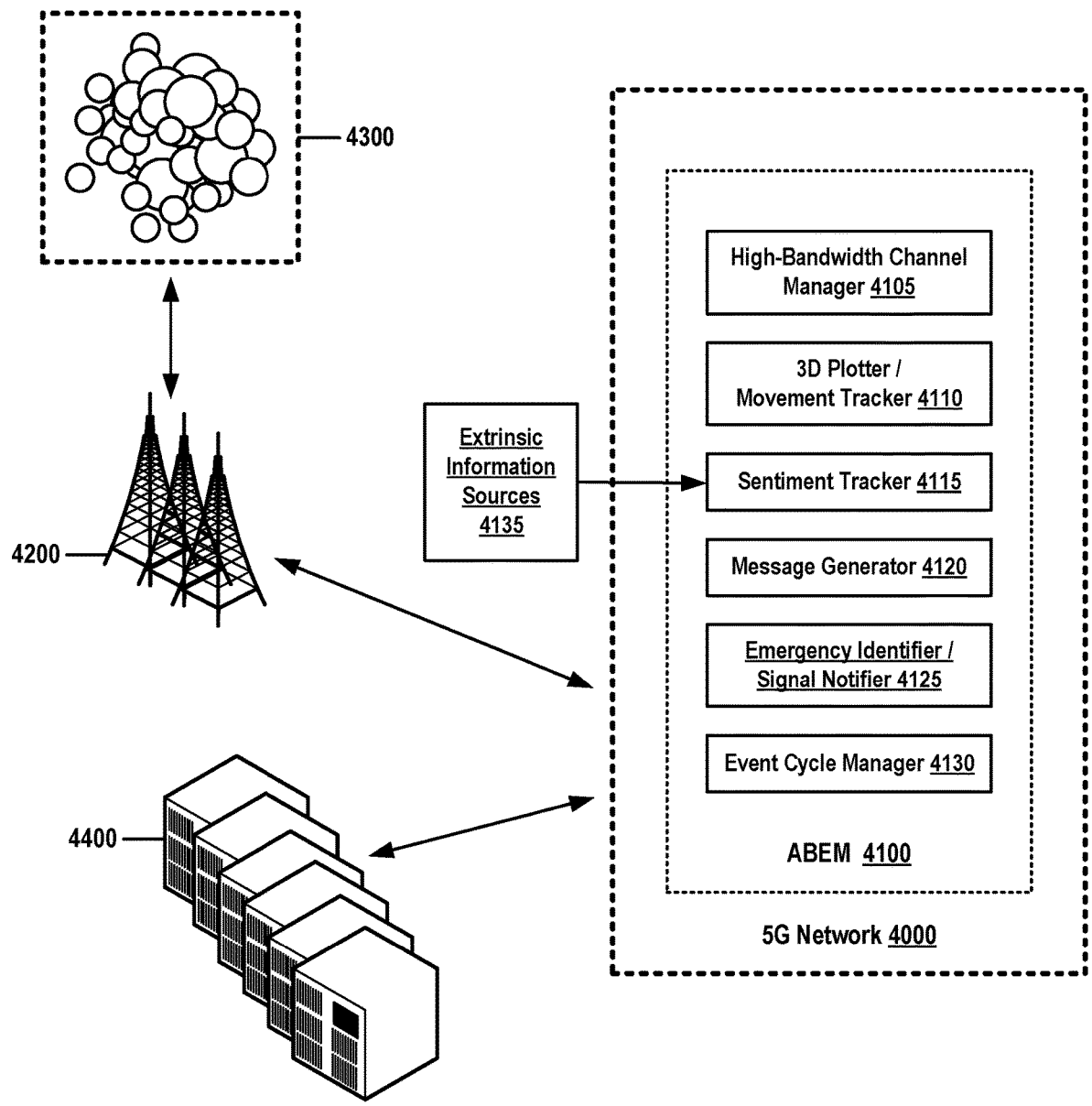
FIG. 4 illustrates a framework of a system for cognitive emergency management on a 5G telecom network in accordance with embodiments of the present invention.

FIG. 4 illustrates a framework of a system for cognitive emergency management on a 5G telecom network in accordance with embodiments of the present invention. FIG. 4 contains items 4000-4300 and 4105-4135.

AI based Emergency Manager (ABEM) 4100 is a cognitive emergency-management application integrated into the service-orchestration layer of a 5G network 4100. The ABEM comprises six main modules:

high-bandwidth channel manager 4105 uses native functionality of the 5G network 4100 to orchestrate, deploy, and manage an ad hoc high-bandwidth mesh network. ABEM 4100 uses this dynamic network to communicate with IoT devices 4300 that transmit position data and other information characterizing physical movements of a mass assembly of people. IoT devices may include any IoT devices known in the art that are normally used in close proximity to a user, such as a fitness tracker, a watch, a smart phone, smart clothing, other wearable devices, a tablet, or another type of mobile computing device capable of supporting 5G connectivity. As used here, the term "close proximity" refers to a distance too small to be resolved by the trilateration capabilities of 5G network 4000, such that a device and the user of the device appear to the network 5000 to have the same location.

Embodiments described in this document will only monitor or track users, and will only include a user's devices in such ad hoc networks, if the user provides express permissions or other express consent, such as by means of an opt-in mechanism. In some embodiments, users will be notified and required to approve or consent to, an embodiment's actions that involve connecting, tracking, reporting, or disconnecting a user or a user's devices;

3D plotter/movement tracker 4110 tracks movements of each member of the mass assembly by interpreting data received from that person's IoT devices through the ad hoc network. This mechanism may use a method of trilateration to determine the exact position and movement of each IoT device. As known in the art, trilateration identifies a subject's physical location by comparing relative distances between the subject and three or more cell towers, base stations, or, in the case of a 5G network, EnodeB ("Evolved Node B") transmitters 4200. In embodiments that comprise an additional "3D" parameter, movement tracker 4110 also receives and interprets values of the 3D parameter from the IoT devices 4300;

sentiment tracker 4115 uses cognitive or artificially intelligent technologies to infer semantically meaningful patterns from the data reported by 3D plotter/movement tracker 4100, from which may be further inferred an aggregate or average emotional state or sentiment of the entire mass assembly. These inferences allow the system to determine the likely occurrence of a critical event that requires the system to initiate a mitigation. The inferences may be facilitated by contextual information received from one or more extrinsic information sources 4135. Extrinsic sources 4135 may include weather services, traffic reports, event schedules, street maps, building blueprints, historical logs of prior mass assemblies, news items, and any other information deemed by an implementer to be capable of providing context to movements reported by movement tracker 4110.

message generator 4120 uses cognitive or artificially intelligent technologies to select mitigating actions capable of mitigating adverse effects of a detected critical event. These actions can, for example, include generating sequences of instructions, warnings, public-service announcements, or notifications intended to notify emergency services and other resources 4400 that a critical event has occurred, or that are intended to mitigate or resolve adverse effects of the critical event on members of the mass assembly by providing instructions or warnings to each identified member;

emergency identifier/signal notifier 4125 sends the instructions, warnings, public-service announcements, or notifications generated by message generator 4120 to the appropriate recipients. For example, notifier 4125 may send evacuation instructions, adverse-weather warnings, or traffic alerts to mass-assembly members by pushing those notifications to IoT devices 4300 through the ad hoc channel. Notifier 4125 could also use communication mechanisms of 5G network 4000 to notify an emergency-management resource 4400 that a critical event has occurred or has been resolved; and event cycle manager 4130 performs end-to-end orchestration and management of the cognitive emergency-management system during performance of the method of FIG. 5, coordinating the operation of, and facilitating communications among, ABEM modules 4105-4125 and entities 4200-4400 and 4135.

Figure 5:
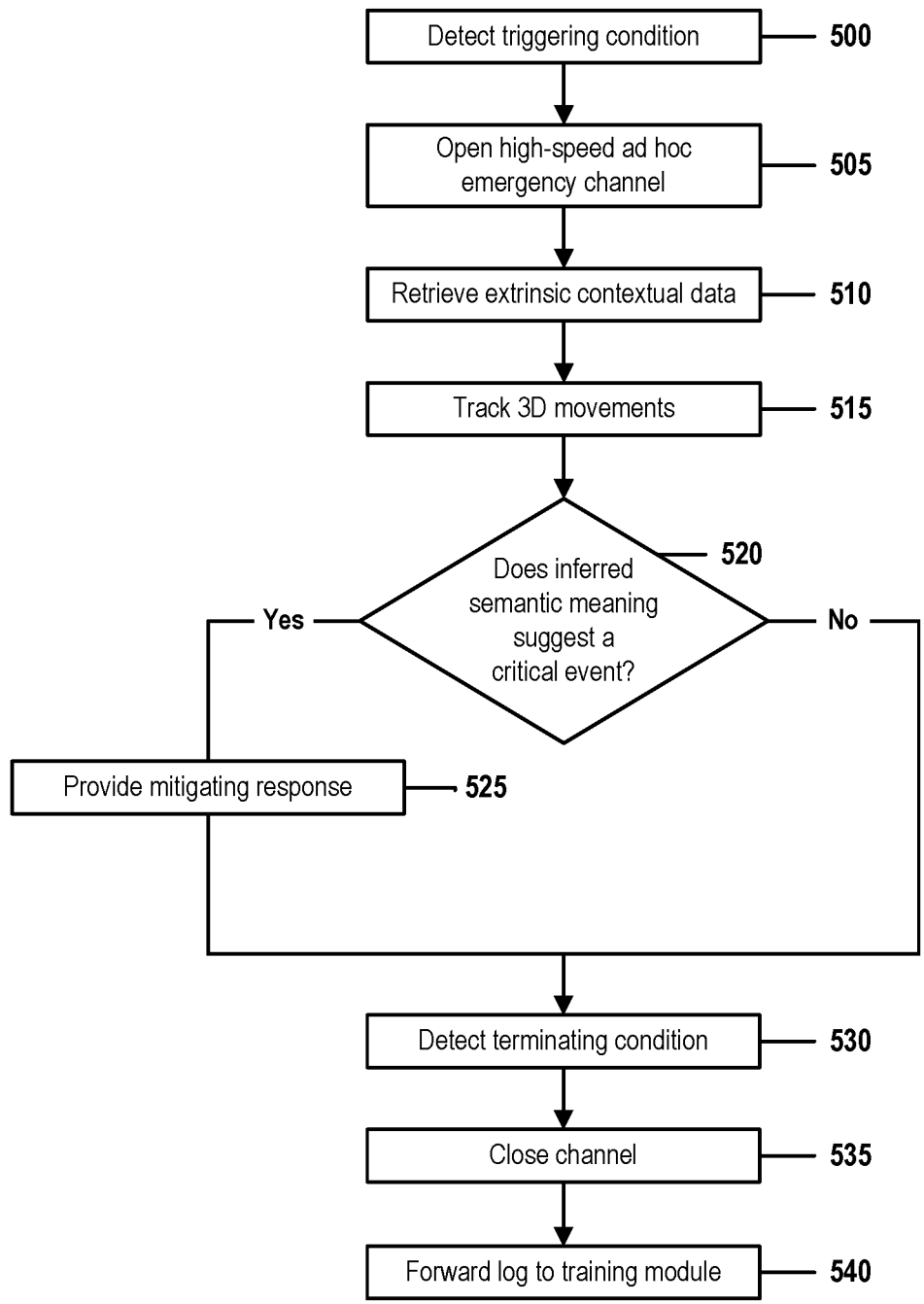
FIG. 5 is a flow chart that illustrates steps of a method for cognitive emergency management on a 5G telecom network in accordance with embodiments of the present invention.

FIG. 5 is a flow chart that illustrates steps of a method for cognitive emergency management on a 5G telecom network in accordance with embodiments of the present invention. FIG. 5 contains steps 500-540.

In step 500, cognitive 5G emergency-management system ABEM 4100 initiates the method of FIG. 5 in response to the occurrence of a triggering condition. This triggering condition may have been previously scheduled, such as a starting time of an event like a concert, parade, or public ceremony.

In other cases, the triggering condition is automatically detected by ABEM 4100. For example, ABEM 4100, using known methods of artificial intelligence, may detect that a large number of IoT devices have converged into a same physical location or have begun moving in a coordinated pattern. In another example, ABEM 4100 may merely determine that a large number of IoT devices 4300 have begun moving in a coordinated pattern, indicating that a large number of people are acting together as a group.

Embodiments described in this document will only monitor or track users, and will only include a user's devices in such ad hoc networks, if the user provides express permissions or other express consent, such as by means of an opt-in mechanism. In some embodiments, users will be notified and required to approve or consent to, an embodiment's actions that involve connecting, tracking, reporting, or disconnecting a user or a user's devices.

If ABEM 4100 is already directly or indirectly monitoring members of a mass assembly, the triggering condition may be an inference made through known means of cognitive analytics or artificial intelligence. For example, a triggering condition may comprise a determination that rush-hour traffic conditions are developing on a certain highway or that the audience of a marathon running competition has begun to assemble.

ABEM 4100 may detect or determine the occurrence of a triggering condition through any means desired by an implementer. In one example, ABEM 4100 may identify the start of a previously scheduled assembly by referring to an internal public-events calendar or schedule of private events, such as a company's employee outing. In other cases, ABEM 4100 may autonomously determine the occurrence of a triggering event as a function of contextual information retrieved from extrinsic information sources 4135. Some embodiments may allow an administrator or another module of 5G network 4000 to manually launch the method of FIG. 5. In yet other cases, ABEM 4100 may use cognitive means to infer from any of these sources that a triggering even has occurred or is likely to occur.

Upon detection of the triggering event, ABEM 4100 may identify some or all of the members of the assembly or may identify the IoT devices 4300 capable of tracking movements of some or all members of the assembly. The physical location of each identified IoT device may be determined through methods of trilateration intrinsic to 5G networks.

In step 505, high-bandwidth channel manager 4105 of ABEM 4100 uses native functionality of 5G network 4000 to open an ad hoc communication channel to the assembly of IoT devices 4300 identified in step 500. This ad hoc channel may be opened by means of native functionality of the service-orchestration layer of the 5G network 4000. The ad hoc channel may be a dynamic, highspeed, low-latency channel capable of hosting a dynamic mesh network that continuously revises its topology in response to the continuous addition of users to the mass assembly or removal of users from the mass assembly.

If it has not already done so, ABEM 4100 in this step will identify some or all of the members of the assembly or may identify the IoT devices 4300 capable of tracking movements of some or all members of the assembly.

The highspeed ad hoc channel is capable of communicating with each device of the IoT devices 4300, even when the total number of IoT devices 4300 is very large. The channel may continuously connect and disconnect individual devices as the devices join and leave the assembly or as members continuously join and leave the mass assembly. In some embodiments, the ad hoc network provided by the channel can be a mesh network that allows each connected IoT device to communicate with other devices on the mesh network.

Changes in the membership of the assembly may be detected automatically and in real time by any known means, such as by comparing the positions or movements of a user's IoT devices or by cognitively inferring patterns in a member's movements that correlate with aggregate movement patterns of the entire assembly. A member or a device may be identified as being part of the assembly through inferential or cognitive means, by correlating the member's or device's patterns of movement with movement patterns of other members or devices comprised by the assembly.

The ABEM 4100 may identify the physical location of each IoT device connected through the ad hoc channel by means of 5G trilateration. In some embodiments, ABEM 4100 can also receive other information from certain IoT devices. For example, a footstep-tracker equipped with an accelerometer could transmit information about a user's rate of acceleration or deceleration or about the number of steps a user takes during a fixed period of time.

In some embodiments, movement tracker 4110 may continuously monitor the position of each IoT device in real-time, but if technical, cost, performance, or other factors make this impractical, movement tracker 4110 may periodically sample each IoT device's current position, possibly interpolating a device's position at times between each pair of samples.

In step 510, Sentiment tracker 4115 retrieves contextual information from one or more extrinsic information sources 4135. As described above, this information may comprise any sort of background or reference information from which sentiment tracker 4115 may infer context for the tracked activity of the mass assembly. This information may include news reports, weather forecasts, event schedules, traffic reports, and other information that may help identify the purpose, duration, or timing of a mass assembly.

In step 515, the 3D plotter 4110 may track or analyze a "3D" parameter received from IoT devices 4300, inferred from characteristics of the IoT devices 4300, or inferred from other signals received from IoT devices 4300. In addition to the latitude and longitude of each IoT device's physical location, this 3D parameter allows ABEM 4100 to correlate movements and extrinsic contextual information with a third tracked parameter deemed by an implementer to be relevant to a particular embodiment.

For example, 3D plotter 4110 tracks and draws inferences from its detection of log-in/log-out activity, inferring patterns in the rate at which members or devices join or leave the assembly. A sharp increase in log-out activity might mean that the assembly is dispersing and a sharp decrease in log-in activity could mean that the event for which the assembly has been gathering has finally begun.

In another example, 3D plotter 4110 tracks and draws inferences from its detection of patterns that indicate that certain subsets of the mass assembly of people or certain subsets of the set of IoT devices are moving in certain directions or at certain speeds. In yet another example, 3D plotter 4110 tracks and draws inferences from densities of subsets of the tracked users or from types of data that are received from only certain types of IoT devices. For example, a fitness tracker may provide information about pulse rates, blood pressure, or other biometrics from which may be inferred a user's response to stressors.

In some embodiments, these inferences may be further supported by other information tracked from more intelligent user devices, such as smartphones, mobile computers, or tablets. For example, the system could infer from the fact that a significant number of phones in the same geographical location dial a particular phone number at almost the same time that the owners of those phones belong to a talent-contest audience that has been asked to vote for a certain performer by dialing that number.

Sentiment tracker 4115 analyzes at least of subset of this received information and derived patterns to associate the assembly's movements with semantic meanings. This allows ABEM 4100 to guess at the average, overall, or aggregate sentiment of the assembly or to determine if the assembly's movements match those that would be predicted in an assembly of the type being monitored.

For example, a mass assembly of IoT-equipped automobiles on a highway would be expected to be moving in the same direction at a rate of speed close to that of the highway's speed limit. If, however, one subset of the automobile IoT devices are not moving and a second subset of automobile IoT are leaving the highway in unexpectedly large numbers through an exit just prior to reaching the area of stopped automobiles, sentiment tracker 4115 may infer that: i) an unexpected traffic condition has made the highway temporarily unpassable; and ii) the occupants of the IoT-equipped automobiles are in aggregate experiencing a stressful situation.

If a weather report retrieved from an extrinsic source 4135 reports that the region around the highway is experiencing adverse weather conditions, the system could infer that the unexpected event is likely to be a traffic accident. In a similar example, if the first subset was merely moving slowly, rather than being completely stopped, the system might instead infer from the report that inclement weather has made the highway hazardous. In yet another example, if a public-events schedule retrieved from an extrinsic source 4135 notes that a concert was scheduled to begin three hours earlier at a stadium adjacent to the highway, then the system might infer that the highway stoppage is being caused by an influx of concertgoers leaving the stadium en masse.

At the conclusion of step 510, the system will have opened an ad hoc 5G channel to a a large number of IoT devices, determined the physical positions and patterns of movement of each IoT device, determined through cognitive means that the devices are associated with members of a mass assembly, optionally imported extrinsic information capable of providing context for the patterns of movement, and inferred through cognitive means an aggregate sentiment of the assembly members and a determination of whether an unexpected event or condition has taken place.

In step 520, event cycle manager 4130 (possibly working in concert with other ABEM modules or with other components of the 5G network 4000) determines whether the inferences developed during the proceeding steps suggest a likelihood that a critical event has occurred. Here, a critical event is one that affects the mass assembly in a negative manner, and to which ABEM 4100 is capable of responding with a corrective action.

In previously described examples, manager 4130 might determine that the traffic accident or the dangerous road conditions are critical events to which ABEM 4100 should respond with corrective procedures. In some cases, manager 4130 might also determine that the influx of concertgoers onto the highway is great enough to be treated as a critical event. In other cases, however, when extrinsic information like past records of concert traffic indicate that concert-related traffic congestion is usually brief in duration, manager 4130 might instead determine that the resulting traffic problem does not rise to the level of a critical event.

ABEM 4100 performs step 525 if it is determined in step 520 that a critical event has occurred. Step 525 comprises a coordinated effort between the message generator 4120 and the emergency identifier/signal notifier module 4125.

Emergency identifier/signal notifier module 4125 is directed by event cycle manager 4130 to determine an appropriate response to the particular type of critical event identified by Sentiment tracker 4115. This determination includes identifying parties to be notified, which may include emergency services 4400 like a 911 dispatcher, local police and fire departments, a public-transportation or traffic-control agency, an emergency-alert service, a hospital or ambulance service, news outlets, a management team, or any other resource or venue equipped to address the critical event. In some cases, the parties to be notified include the assembly members themselves.

Emergency identifier/signal notifier module 4125, under the direction of event cycle manager 4130, also directs message generator 4125 to generate notifications or alerts to be delivered to the parties to be notified.

In the case where a road is blocked by a traffic accident or has become hazardous due to weather conditions, emergency identifier/signal notifier module 4125 might direct message generator 4125 to generate a text alert capable of warning motorists of the problem and directing motorists to exit the highway before reaching the compromised span. Emergency identifier/signal notifier module 4125 might than forward the alert to each assembly member's smartphone or IoT smartcar console as an SMS text message. If ABEM 4100 has identified a critical event that comprises a traffic accident, a similar message might be sent to local police, EMT, and fire dispatchers and to an ambulance service.

In another example, if a mass assembly is a public parade, ABEM 4100 might infer from extrinsic information and from unexpected movement patterns that the published parade route has been obstructed by an unforeseen road hazard. The system might then undertake a series of corrective actions that notify city officials and parade organizers that an alternate route must be selected. After receiving a response that identifies an alternate route, ABEM 4100 would then, through the ad hoc channel, notify each member of the assembly that the parade has been diverted.

In yet another example, if smoke is detected during a theater performance, ABEM 4100 could notify audience members of the potential danger and guide them safely to fire exits in an organized manner. ABEM 4100 could also, through the 5G network, simultaneously alert fire and medical personnel of the possible danger. Furthermore, ABEM 4100 could, throughout the entire corrective procedure, monitor the aggregate sentiment or emotional state of the assembly, and determine in real time how to most effectively ensure that audience members remain calm during the exit. Finally, if a fire does break out, ABEM 4100 can continue to track the position of each audience member to ensure that every member of the assembly is accounted for. All of these functions may be facilitated by inferences developed from documents retrieved from extrinsic information sources, such as building blueprints and fire-safety posters that identify the location of fire exits.

ABEM 4100 may thus respond quickly and intelligently to the occurrence of a critical event that has the potential to adversely affect a mass assembly of people. By combining the ability of a 5G network to create highspeed, ad hoc, low-latency, dynamic channels with its ability to integrate artificially intelligent cognitive functions directly into its service-orchestration layer, embodiments of the present invention provide real-time detection and mitigation of large-scale emergency situations.

In step 530, ABEM 4100 detects a terminating condition that indicates that the mass assembly is dispersing or no longer needs to be tracked. Any terminating condition desired by an implementer may be accommodated. In some embodiments, ABEM 4100 intelligently selects an appropriate terminating condition as a function of the semantic meaning associated with the assembly and any events that may have occurred.

For example, if an assembly comprises a concert audience, a terminating condition may occur when the majority of assembly members have left the concert hall or have begun to move in diverse directions, or after a designated duration of time has elapsed after the end of the concert. A terminating condition for an assembly of rush-hour drivers may be deemed to occur at a certain time of day or may be inferred when movement tracker 4110 determines that traffic volume no longer exceeds a threshold level.

In step 535, channel manager 4105 closes the ad hoc channel, thereby ending the monitoring of IoT devices 4300. This step may, in some embodiments, occur automatically when movement tracker 4110 or sentiment tracker 4115 determines that IoT devices 4300 are no longer moving in similar patterns.

In optional step 540, event cycle manager 4130 forward a log of the previous steps of FIG. 5. This log may identify characteristics of the assembly, of the tracked movement patterns and subtextual or sentiment inferences, of contextual information retrieved from extrinsic sources 4135, of any critical events, and of any required corrective actions.

This log may be forwarded to a training module of a machine-learning facility. The training module will then incorporate elements of the log into a training corpus used to train a self-learning ABEM 4100 system to more accurately or intelligently infer semantic meanings, identify critical events, develop context, select corrective actions, and perform other cognitive functions during subsequent iterations of the method of FIG. 5.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

The claims are as follows:

1. A 5G cognitive emergency-management system comprising a processor, a memory coupled to the processor, and a computer-readable hardware storage device coupled to the processor, the storage device containing program code configured to be run by the processor via the memory to implement a method for cognitive emergency management on a 5G telecom network, the method comprising:
   the processor, in response to detecting, through a method of artificial intelligence, that a continuously varying set of Internet of Things (IoT) devices have begun moving in a coordinated pattern, deploying a cognitive emergency-management application that is integrated into the service-orchestration layer of the 5G telecom network,
   where the deploying comprises directing the cognitive application to use artificial intelligence in conjunction with native service-orchestration functionality of the 5G telecom network:
      to open an ad hoc 5G communication channel through the 5G telecom network, and to provision, through the channel, a dynamic high-bandwidth mesh network through which any pair of IoT devices, while concurrently within the set of IoT devices, are capable of communicating with each other via 5G protocols,
   where each device of the set of IoT devices is associated with a corresponding member of a mass assembly of users,
   where the cognitive application continuously revises a topology of the mesh network in response to continuous additions to and deletions from the set of IoT devices, and
   where each device of the set of IoT devices shares a same physical location with its corresponding member of the mass assembly;
   the processor tracking movements of the assembly of users by monitoring, through the ad hoc 5G channel, changes in location of each device currently in the set of IoT devices;
   the processor inferring, through a method of artificial intelligence, from the tracked movements that the mass assembly is experiencing one or more effects of a critical event; and
   the processor responding to the inferring by initiating one or more corrective actions that are intended to mitigate an adverse effect of the critical event upon the assembly of users.

2. The system of claim 1, where the inferring further comprises identifying patterns in an aggregate movement of one or more subsets of the mass assembly of users.

3. The system of claim 2,
   where the inferring further comprises inferring, from the identified patterns, an aggregate sentiment of the mass assembly of users,
   where at least one pattern of the identified patterns is an unexpected pattern that does not conform to known patterns of aggregate movement, and
   where the inference that the mass assembly is experiencing the one or more effects of a critical event is derived at least in part from the inferential identification of the aggregate sentiment.

4. The system of claim 1, further comprising:
   the processor detecting that a new user associated with a previously unconnected IoT device has joined the mass assembly;
   the processor responding to the detecting by automatically adding a dynamic connection to the mesh network, through the ad hoc 5G channel, to the previously unconnected IoT device;
   the processor further detecting that a currently tracked member of the mass assembly has left the mass assembly; and
   the processor responding to the further detecting by automatically closing all dynamic connections of the dynamic mesh network to IoT devices, of the set of IoT devices, associated with the currently tracked member.

5. The system of claim 1, where the dynamic mesh network continuously adjusts its mesh-network topology to allow the set of IoT devices to communicate with each other.

6. The system of claim 1 further comprising:
   the processor retrieving contextual data from an extrinsic source; and
   the processor deriving the inference that the mass assembly is experiencing an effect of a critical event at least in part from consideration of the contextual data.

7. The system of claim 1, where the corrective actions comprise notifying an emergency-management resource that the mass assembly is experiencing the effect of the critical event.

8. The system of claim 1, where the corrective actions comprise providing information to members of the mass assembly through the ad hoc channel.

9. The system of claim 1, where the tracking further comprises:
   the processor repeatedly determining, through native trilateration functionality of the 5G telecom network, a current location of each device of the set of IoT devices.

10. A method for cognitive emergency management on a 5G telecom network, the method comprising:
   a processor of a cognitive emergency-management system, in response to detecting, through a method of artificial intelligence, that a continuously varying set of Internet of Things (IoT) devices have begun moving in a coordinated pattern, deploying a cognitive emergency-management application that is integrated into the service-orchestration layer of the 5G telecom network,
   where the deploying comprises directing the cognitive application to use artificial intelligence in conjunction with native service-orchestration functionality of the 5G telecom network:
      to open an ad hoc 5G communication channel through the 5G telecom network, and to provision, through the channel, a dynamic high-bandwidth mesh network through which any pair of IoT devices, while concurrently within the set of IoT devices, are capable of communicating with each other via 5G protocols,
   where each device of the set of IoT devices is associated with a corresponding member of a mass assembly of users, where the cognitive application continuously revises a topology of the mesh network in response to continuous additions to and deletions from the set of IoT devices, and where each device of the set of IoT devices shares a same physical location with its corresponding member of the mass assembly;

the processor tracking movements of the assembly of users by monitoring, through the ad hoc 5G channel, changes in location of each device currently in the set of IoT devices;

the processor inferring, through a method of artificial intelligence, from the tracked movements that the mass assembly is experiencing one or more effects of a critical event; and the processor responding to the inferring by initiating one or more corrective actions that are intended to mitigate an adverse effect of the critical event upon the assembly of users.

11. The method of claim 10, where the inferring further comprises inferring, from the identified patterns, an aggregate sentiment of the mass assembly of users, where at least one pattern of the identified patterns is an unexpected pattern that does not conform to known patterns of aggregate movement, and where the inference that the mass assembly is experiencing the one or more effects of a critical event is derived at least in part from the inferential identification of the aggregate sentiment.

12. The method of claim 10, further comprising:

the processor detecting that a new user associated with a previously unconnected IoT device has joined the mass assembly;

the processor responding to the detecting by automatically adding a dynamic connection to the mesh network, through the ad hoc 5G channel, to the previously unconnected IoT device;

the processor further detecting that a currently tracked member of the mass assembly has left the mass assembly; and the processor responding to the further detecting by automatically closing all dynamic connections of the dynamic mesh network to IoT devices, of the set of IoT devices, associated with the currently tracked member.

13. The method of claim 10 further comprising:

the processor retrieving contextual data from an extrinsic source; and the processor deriving the inference that the mass assembly is experiencing an effect of a critical event at least in part from consideration of the contextual data.

14. The method of claim 10, where the tracking further comprises:

the processor repeatedly determining, through native trilateration functionality of the 5G telecom network, a current location of each device of the set of IoT devices.

15. The method of claim 10, further comprising providing at least one support service for at least one of creating, integrating, hosting, maintaining, and deploying computer-readable program code in the computer system, wherein the computer-readable program code in combination with the computer system is configured to implement the detecting, the deploying, the tracking, the inferring, and the responding.

16. A computer program product, comprising a computer-readable hardware storage device having a computer-readable program code stored therein, the program code configured to be executed by a 5G cognitive emergency-management system comprising a processor, a memory coupled to the processor, and a computer-readable hardware storage device coupled to the processor, the storage device containing program code configured to be run by the processor via the memory to implement a method for cognitive emergency management on a 5G telecom network, the method comprising:

the processor, in response to detecting, through a method of artificial intelligence, that a continuously varying set of Internet of Things (IoT) devices have begun moving in a coordinated pattern, deploying a cognitive emergency-management application that is integrated into the service-orchestration layer of the 5G telecom network, where the deploying comprises directing the cognitive application to use artificial intelligence in conjunction with native service-orchestration functionality of the 5G telecom network:

to open an ad hoc 5G communication channel through the 5G telecom network, and to provision, through the channel, a dynamic high-bandwidth mesh network through which any pair of IoT devices, while concurrently within the set of IoT devices, are capable of communicating with each other via 5G protocols, where each device of the set of IoT devices is associated with a corresponding member of a mass assembly of users, where the cognitive application continuously revises a topology of the mesh network in response to continuous additions to and deletions from the set of IoT devices, and where each device of the set of IoT devices shares a same physical location with its corresponding member of the mass assembly;

the processor tracking movements of the assembly of users by monitoring, through the ad hoc 5G channel, changes in location of each device currently in the set of IoT devices;

the processor inferring, through a method of artificial intelligence, from the tracked movements that the mass assembly is experiencing one or more effects of a critical event; and the processor responding to the inferring by initiating one or more corrective actions that are intended to mitigate an adverse effect of the critical event upon the assembly of users.

17. The computer program product of claim 16, where the inferring further comprises inferring, from the identified patterns, an aggregate sentiment of the mass assembly of users, where at least one pattern of the identified patterns is an unexpected pattern that does not conform to known patterns of aggregate movement, and where the inference that the mass assembly is experiencing the one or more effects of a critical event is derived at least in part from the inferential identification of the aggregate sentiment.

18. The computer program product of claim 16, further comprising:

the processor detecting that a new user associated with a previously unconnected IoT device has joined the mass assembly;

the processor responding to the detecting by automatically adding a dynamic connection to the mesh network, through the ad hoc 5G channel, to the previously unconnected IoT device;

the processor further detecting that a currently tracked member of the mass assembly has left the mass assembly; and the processor responding to the further detecting by automatically closing all dynamic connections of the dynamic mesh network to IoT devices, of the set of IoT devices, associated with the currently tracked member.

19. The computer program product of claim 16 further comprising:

the processor retrieving contextual data from an extrinsic source; and the processor deriving the inference that the mass assembly is experiencing an effect of a critical event at least in part from consideration of the contextual data.

20. The computer program product of claim 16, where the tracking further comprises:

the processor repeatedly determining, through native trilateration functionality of the 5G telecom network, a current location of each device of the set of IoT devices.

\* \* \* \* \*